US 8,815,461 B2

(12) United States Patent
Takeuchi et al.

(10) Patent No.: US 8,815,461 B2
(45) Date of Patent: Aug. 26, 2014

(54) SOLID ELECTROLYTE FUEL CELL SYSTEM

(75) Inventors: Kazufumi Takeuchi, Yokohama (JP);
Hiromichi Miwa, Yokohama (JP);
Masaharu Hatano, Yokohama (JP);
Keiko Kushibiki, Fujisawa (JP);
Tatsuya Yaguchi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 444 days.

(21) Appl. No.: 12/746,085

(22) PCT Filed: Nov. 28, 2008

(86) PCT No.: PCT/JP2008/003512
§ 371 (c)(1),
(2), (4) Date: Jun. 3, 2010

(87) PCT Pub. No.: WO2009/072257
PCT Pub. Date: Jun. 11, 2009

(65) Prior Publication Data
US 2010/0279184 A1    Nov. 4, 2010

(30) Foreign Application Priority Data

Dec. 6, 2007   (JP) ................. 2007-315557

(51) Int. Cl.
*H01M 8/04*   (2006.01)
*H01M 8/10*   (2006.01)

(52) U.S. Cl.
USPC ........... 429/439; 429/423; 429/428; 429/433; 429/434

(58) Field of Classification Search
USPC ................................. 429/400–535
See application file for complete search history.

(56) References Cited

U.S. PATENT DOCUMENTS

| 6,797,418 | B1 | 9/2004 | Nomura et al. |
| 2002/0152680 | A1 | 10/2002 | Callaghan et al. |
| 2005/0069741 | A1* | 3/2005 | Enokizu et al. ............... 429/26 |
| 2005/0249991 | A1* | 11/2005 | Pastula et al. ............... 429/20 |
| 2006/0127713 | A1* | 6/2006 | Haltiner et al. ............... 429/17 |
| 2006/0216562 | A1* | 9/2006 | Edlund et al. ............... 429/26 |

(Continued)

FOREIGN PATENT DOCUMENTS

| DE | 10 2006 019 409 A1 | 10/2007 |
| EP | 0 743 694 A1 | 11/1996 |
| EP | 1 167 282 A1 | 1/2002 |
| JP | 5-47399 A | 2/1993 |
| JP | 5-121087 A | 5/1993 |
| JP | 08190926 A * | 7/1996 |
| JP | 08236132 A * | 9/1996 |
| JP | 2002-216808 A | 8/2002 |
| JP | 2002-319416 A | 10/2002 |
| JP | 2007-39322 A | 2/2007 |
| WO | WO 01/95409 A2 | 12/2001 |
| WO | WO 2008/007689 * | 1/2008 ............. H01M 8/04 |

OTHER PUBLICATIONS

European Office Action dated Nov. 21, 2012 (6 pages).

*Primary Examiner* — Basia Ridley
*Assistant Examiner* — Caitlin Wilmot
(74) *Attorney, Agent, or Firm* — Foley & Lardner LLP

(57) ABSTRACT

A solid electrolyte fuel cell system includes a reformer to produce a hydrogen-rich reformed gas from fuel, oxygen and water, and a stack structure including a stack of fuel cell units each receiving supply of the reformed gas and air, and producing electricity. The fuel cell system further includes a reformed gas cooler to cool the reformed gas supplied from the reformer to the stack structure, and a temperature control section to control operation of the reformed gas cooler in accordance with an operating condition such as a request output of the stack structure. The reformed gas cooler includes a device such as a heat exchanger for cooling the reformed gas with a coolant such as air.

18 Claims, 9 Drawing Sheets

(56) References Cited

U.S. PATENT DOCUMENTS

| | | |
|---|---|---|
| 2007/0031718 A1 | 2/2007 | Fujimura et al. |
| 2007/0154753 A1* | 7/2007 | Kushibiki et al. ............... 429/22 |
| 2007/0189938 A1* | 8/2007 | Valensa .......................... 422/198 |
| 2007/0190382 A1* | 8/2007 | Fischer ........................... 429/30 |
| 2010/0047646 A1* | 2/2010 | Kitamura ........................ 429/25 |

* cited by examiner

SOLID ELECTROLYTE FUEL CELL SYSTEM

TECHNICAL FIELD

The present invention relates to a fuel cell system or apparatus including a reformer to produce a reformed gas, and a stack structure including a stack of fuel cell units, and technique (such as system and/or process) of controlling the temperature of the stack structure.

BACKGROUND ART

A published Japanese Patent Application, Kokai No. 2005-183375 shows a solid electrolyte type fuel cell system including a cell stack assembly composed of a plurality of cell stacks, a gas manifold provided with the cell stack assembly, a reformer to produce a hydrogen-rich reformed gas by steam reforming, and a reformed gas supplying tube connecting the reformer to the gas manifold, which are provided inside a housing. This fuel cell system is arranged to heat the reformer with an off gas discharged from the cell stack assembly.

There are three different reforming reactions performed in the reformer. Steam reforming reaction is endothermic, and partial oxidation reaction is exothermic. The third type is auto thermal reaction combining the steam reforming reaction and partial oxidation reaction, to balance the heat absorbed and the heat released. The fuel cell system of the above-mentioned patent document enables efficient operation by supplying waste heat from the cell stack assembly efficiently to the reformer, and thereby increasing the percentage of the endothermic steam reformation.

DISCLOSURE OF INVENTION

The fuel cell system of the above-mentioned patent document is adequate as a stationary system for supplying a constant power constantly for households and factories. However, the application of this fuel cell system is difficult for electric power sources of vehicles such as electric vehicles.

When a fuel cell system is used as a power source for a vehicle, the load is varied frequently in dependence on a vehicle operating condition or conditions. Therefore, the fuel cell system for a vehicle is required to function properly even when a request output is increased steeply.

In order to increase the output of the cell stack assembly in accordance with an abrupt increase of the request output, the fuel cell system is required to produce the reformed gas abundantly by supplying a sufficient amount of heat to the reformer. However, the fuel cell system of the above-mentioned patent document is unable to supply a sufficient amount of heat quickly to the reformer because the heat source of the reformer is the off gas of the cell stack assembly.

Beside the method of supplying heat to the reformer with the off gas of the cell stack assembly, it is possible to heat the reformer by increasing the proportion of the exothermic partial oxidation reforming reaction, or by utilizing heat produced by mixing combustion of fuel and air in a combustor.

In the case of the methods of heating the reformer with means other than the off gas, however, the cell stack assembly increases the amount of heat generation to increase the output, and at the same time the heated reformed gas is supplied from the reformer heated by another heat source. Consequently, these methods might cause overheat of the cell stack assembly, thereby decrease the durability of the cell stack assembly and cause damage to the cell stack assembly.

It is, therefore, an object of the present invention to provide technique for preventing overheat of a stack structure even when the output of the stack structure is increased abruptly. It is another object of the present invention to provide a fuel cell system suitable for the application for vehicles.

According to the present invention, a solid electrolyte fuel cell system comprises: a reformer to produce a reformed gas such as a hydrogen-rich reformed gas from materials such as fuel, oxygen and water; a stack structure including a stack of fuel cell units each receiving the supply of the reformed gas and air, and producing electricity; a reformed gas cooler to cool the reformed gas supplied from the reformer to the stack structure; and a temperature control section to control the operation of the reformed gas cooler.

The temperature control section may be configured to control the reformed gas cooler in accordance with a request output for the stack structure.

BEST MODES FOR CARRYING OUT THE INVENTION

Figure 1:
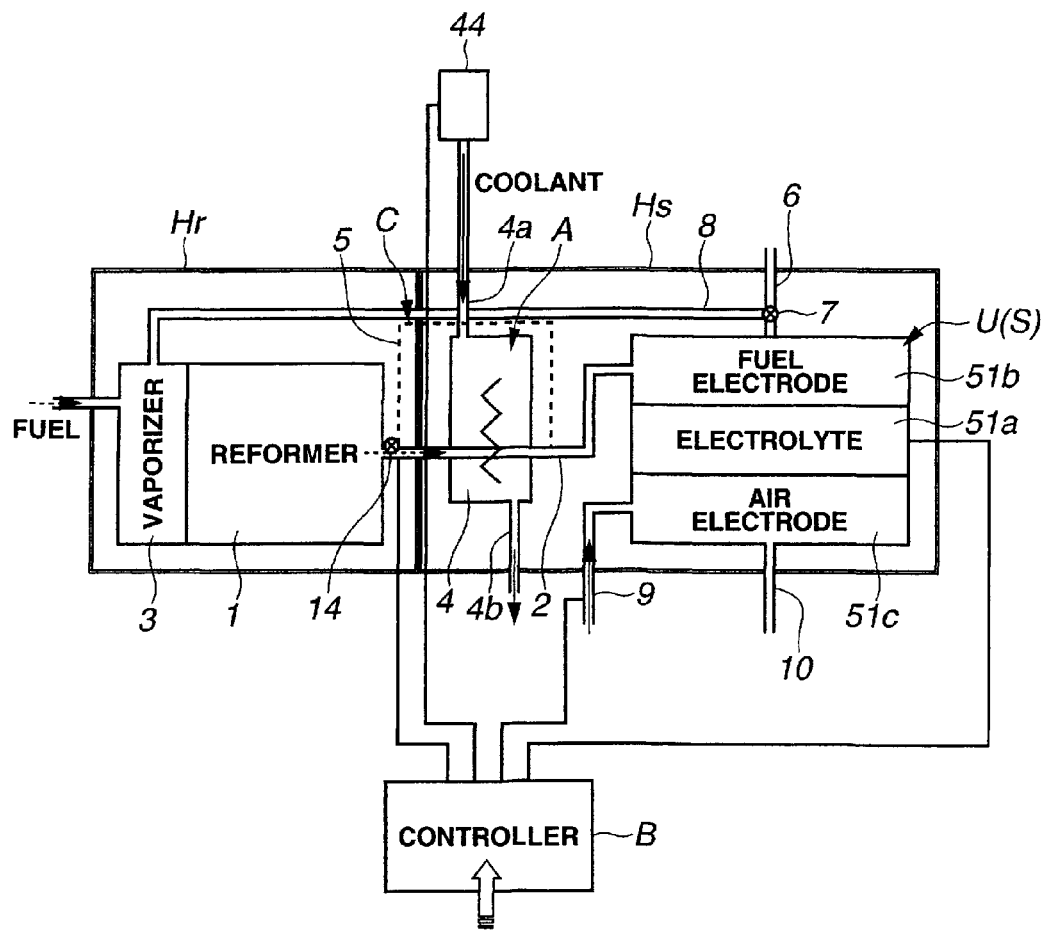
FIG. 1 is a schematic block diagram showing a solid electrolyte fuel cell system according to a first embodiment of the present invention.

FIG. 1 shows a solid electrolyte fuel cell system or apparatus according to a first embodiment of the present invention. The fuel cell system shown in FIG. 1 includes a reformer 1 for producing a reformed gas, and a stack structure S including a stack of cell units U. Reformer 1 of this example produces a hydrogen-rich reformed gas from fuel, oxygen and water. Each of the cell units U receives the supply of the reformed gas and air, and produces electricity.

The fuel cell system of FIG. 1 further includes a reformed gas cooler A which can serve as a component of a reformed gas cooling means for cooling the reformed gas supplied from reformer 1 to stack structure S, and a temperature control section which can serve as a component of a temperature controlling means for controlling the temperature of stack structure S. The temperature control section of this embodiment is configured to control the operation of the reformed gas cooler A. According to the first embodiment, the temperature control section includes at least one of a controller (or temperature controller) B for controlling the temperature of stack structure S (in accordance with a request output for the stack structure) and a reformed gas distributor C which can serve as a component of a reformed gas distributing means for supplying the reformed gas from the reformer to the stack structure, bypassing the reformed gas cooler. In the example shown in FIG. 1, the temperature control section includes both the controller B and the reformed gas distributor C.

The reformer 1 of this example is constructed to produce hydrogen-rich reformed gas from a fuel such as a hydrocarbon fuel, oxygen (including air and other gases containing oxygen) and water, by auto thermal reformation. The temperature of reformed gas produced by reformer 1 is high.

Reformer 1 is connected with stack structure S by a reformed gas supply passage (or tube) 2 for supplying the reformed gas to the fuel electrode of each cell unit U in stack structure S. In this example, reformer 1 is further provided with a fuel vaporizer 3 for vaporizing the fuel.

Reformed gas cooler A of the first embodiment includes a heat exchanger 4 disposed, in reformed gas supply passage 2, between reformer 1 and stack structure S so that the reformed gas supply passage 2 passes through heat exchanger 4. Heat exchanger 4 includes a coolant inlet port connected with a coolant inlet passage (or tube) 4a to introduce a coolant into heat exchanger 4, and a coolant outlet port connected with a coolant outlet passage (or tube) 4b for let out the coolant from heat exchanger 4. This example employs air as the coolant. In the example shown in FIG. 1, the reformed gas cooler A further includes a coolant flow regulator 44 connected with the coolant inlet port of heat exchanger 4 through coolant inlet passage 4a and arranged to regulate the flow of the coolant through heat exchanger 4. Coolant flow regulator 44 of this examples is located outside heat exchanger 4, and includes a blower. When the coolant is liquid, the coolant flow regulator 44 includes a pump. The coolant flow regulator 44 may include a valve for regulating the flow rate of the coolant.

Reformed gas distributor C of this example includes a bypass passage (or tube) 5 which branches off from the reformed gas supply passage 2 at a branch point, bypasses heat exchanger 4, and then joins into the reformed gas supply passage 2 at a joint point, and a selector (or changeover) valve 14 (serving as a directional control valve) disposed at the branch point. Selector valve 14 is arranged to select one of a first select position to enable the reformed gas to flow from reformer 1 through heat exchanger 4 to stack structure S and a second select position to enable the reformed gas to flow from reformer 1, without passing through heat exchanger 4, to stack structure S. With selector valve 14, the reformed gas distributor C can control the quantity of the cooled reformed gas cooled by heat exchanger 4 and the quantity of the non-cooled reformed gas detouring the heat exchanger 4, and thereby control the heat quantity of the reformed gas supplied to stack structure S.

Each of the cell units U includes a single cell 51 (51a, 51b, 51c) functioning as an element for generating electrical power, and a separator plate 52 supporting the single cell 51. The single cell 51 of the example shown in FIG. 1 includes a fuel electrode 51b, an air electrode 51c, and an electrolyte (layer) 51a sandwiched between the two electrodes 51b and 51c. The separator plate 52 covers the fuel electrode side of single cell 51 gas tightly. In this example, separator plate 52 is in the hollow, flattened shape, and cell unit U is shaped like a circular disc, as a whole. Separator plate 52 defines an inside space formed between separator plate 52 and fuel electrode 51b of single cell 51, and arranged to serve as a passage of the reformed gas. In this inside space serving as the reformed gas passage, there is disposed an inner electrical collector 53 having a gas permeability.

Each cell unit U is provided with a passage forming member 54 at the center. In the stack state in which the cell units U are stacked, the passage forming members 54 define a reformed gas introduction passage 55 extending along the center line of the stack. Each of the passage forming members 54 is formed with a reformed gas introduction hole 56 extending from the reformed gas introduction passage 55 into the inside of the corresponding cell unit U. The passage forming members 54 further define a reformed gas discharge passage (not shown in FIG. 9), and each member 54 includes a reformed gas discharge portion.

Figure 10:
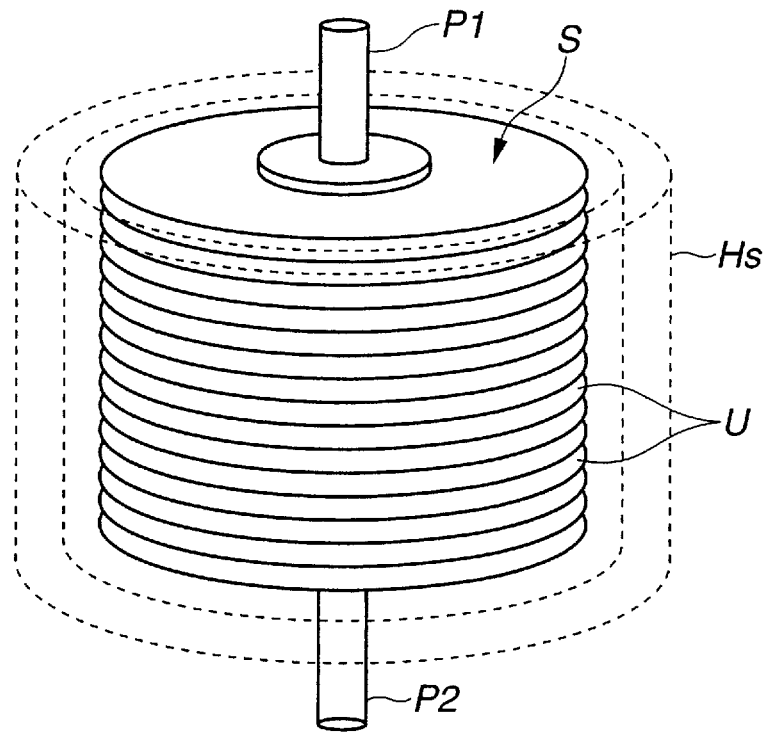
FIG. 10 is a perspective view for illustrating the stack structure used in the illustrated embodiments.

The cell units U are stacked with the interposition of outer electric collectors 57 each of which is disposed between the air electrode 51c of one single cell 51, and the adjacent cell unit U. As shown in FIG. 10, the stack structure S is connected with pipes P1 and P2 communicating, respectively, with the reformed gas introduction passage 55, and the reformed gas discharge passage, and projecting in two opposite direction along the center line of stack structure S from the central portions of the upper and lower ends of stack structure S. Stack structure S is disposed in a hermetically sealed heat insulating container or vessel Hs.

In FIG. 1, the stack structure S is shown in a simplified form having only one cell unit U including the electrolyte 51a, fuel electrode 51b and air electrode 51c, in order to illustrate fluid passages or piping. The reformed gas supply passage 2 is connected to the fuel electrode 51b of each cell unit U so as to supply the cooled or non-cooled reformed gas to the fuel electrodes 51b.

Fuel electrode 51b of each unit cell U is further connected with a reformed gas exit passage (tube) 6. This reformed gas exit passage 6 is connected through a selector (or changeover) valve 7 with a reformed gas return passage (tube) 8 extending from the joint point at which exit passage 6 is joined with return passage 8 through selector valve 7, to the vaporizer 3 of reformer 1. Vaporizer 3 is arranged to utilize, as part of the heat source for vaporizing the fuel, the reformed gas discharged from stack structure S. The air electrode of each cell unit U is connected with an air supply passage (tube) 9 and an air exit passage (tube) 10.

The temperature controller B according to the first embodiment is a device controlling the operation of reformed gas cooler A and the operation of reformed gas distributor C in accordance with a request output to the stack structure. Temperature controller B receives input information including various data items such as heat quantity of the reformed gas (flow rate, composition and temperature) and the temperature of stack structure S in addition to the above-mentioned request output.

To control the operations of reformed gas cooler A and reformed gas distributor C, the temperature controller B is configured to produce a first control signal or control command to be sent to the reformed gas cooler A to control the flow rate of the coolant or cooling medium (air), and a second control signal or control command to be sent to the reformed gas distributor C to control the selector valve 14 disposed in reformed gas supply passage 2. In the example shown in FIG. 1, temperature controller B further produces a third control signal or control command to control the flow rate of air supplied to stack structure S. The control of the flow rate can be performed by controlling the opening degree of a valve. In the example shown in FIG. 1, temperature controller B controls the operation of reformed gas controller A by controlling the blower 44.

In the first embodiment, the reformer 1 (together with vaporizer 3) is disposed in a heat insulating container or vessel Hr separately from the heat exchanger 4 and stack structure S which are enclosed in the heat insulating container Hs. This insulating container structure composed of the containers Hr and Hs insulates reformer 1 and stack structure S from each other thermally, and restrains the heat transfer or the exchange of heat therebetween, except the heat transfer through the reformed gas. By doing so, this insulating container structure composed of the separate insulating containers Hr and Hs can improve the effect of the control of the temperature of stack structure S by the control of heat quantity of the reformed gas, thereby stabilize the temperature of stack structure S, and further improve the controllability or following characteristic to the load varying operation (as in a vehicle) and the durability.

The thus-constructed fuel cell system is mounted on a vehicle (not shown in FIG. 1, but schematically shown at 100 in FIG. 7) such as an electric vehicle, and installed in a vehicle body of the vehicle as an electric power source for the vehicle. This fuel cell system is arranged to produce the hydrogen-rich reformed gas by performing an auto-thermal reforming reaction in reformer 1 with the use of fuel, oxygen and water, and to generate electric energy by performing an electrochemical reaction by supplying the reformed gas to the fuel electrodes 51*b* of cell units U of stack structure S and supplying air to the air electrodes of cell units U.

Figure 2:
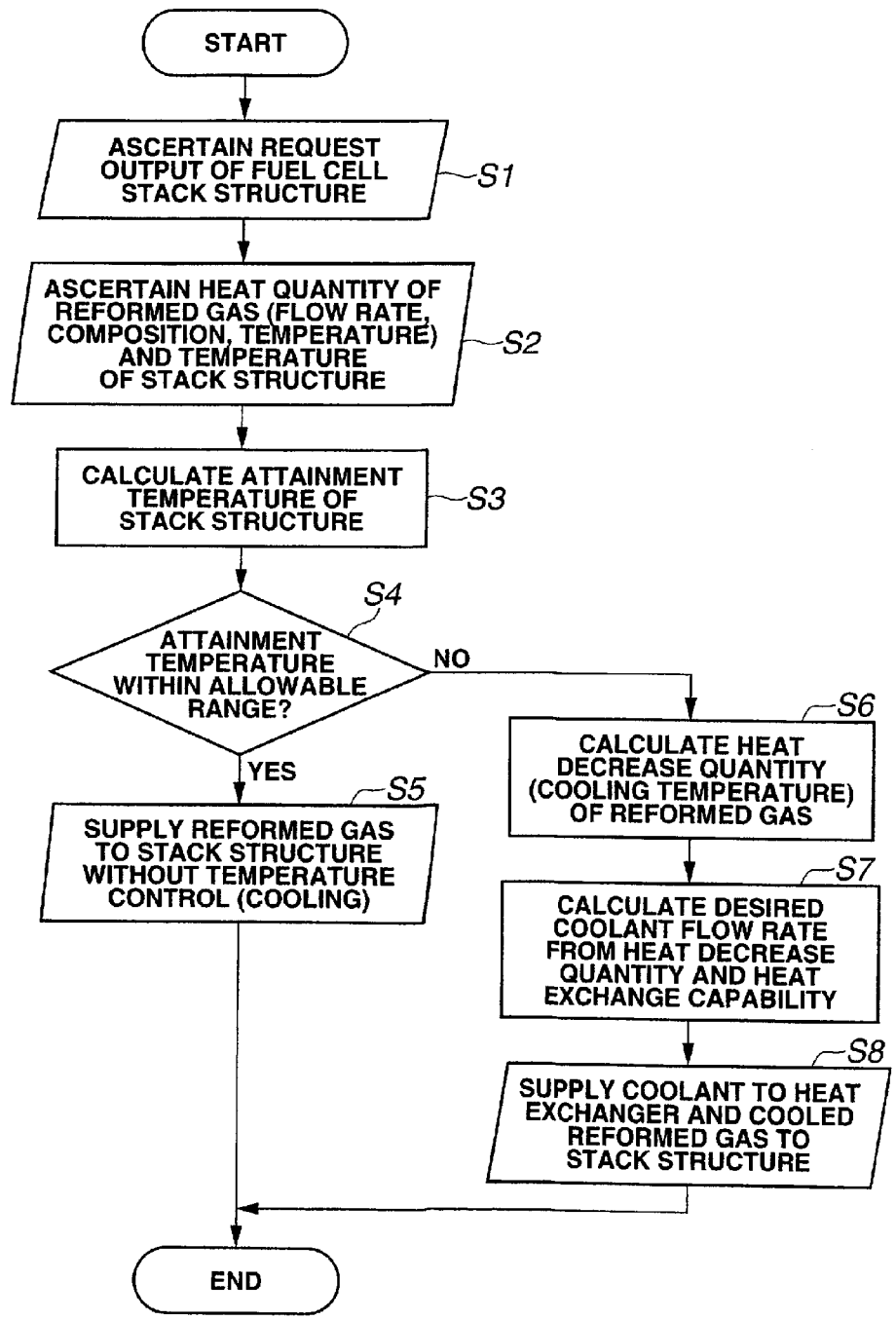
FIG. 2 is a flowchart showing a temperature control process performed by a controller shown in FIG. 1.

The fuel cell system according to this embodiment is to be used as a power source for a vehicle. Therefore, controller B controls operations of the fuel cell system in accordance with a load change due to change in a driving condition of the vehicle. FIG. 2 is a flowchart showing a temperature control process performed by controller B of the first embodiment. This fuel cell system is adapted to be operated in accordance with a load which varies in accordance with a vehicle driving condition, and the temperature controller B is configured to perform the control process of FIG. 2.

After a start of the control, controller B ascertains the request output of the fuel cell system at a step S1. At a next step S2, controller B ascertains the heat quantity of the reformed gas (flow rate, composition and temperature) and the temperature of stack structure S.

The request output can be determined from a vehicle operating condition, such as a driver accelerator input of the vehicle. In this example, the request output is determined from a condition of an accelerator pedal of the vehicle, such as a pedal depression force applied on the accelerator pedal, sensed by an accelerator condition sensor. The quantity of heat (or heat quantity) of the reformed gas can be determined in the following manner. (1) Information is collected on the anode off gas. The information includes the temperature of the anode off gas (sensed by an anode off gas temperature sensor), the composition (determined by calculation), and the flow rate (sensed by a flow sensor or meter). The composition can be determined by calculation from information such as an electric power generating condition immediately before (which can be referred to as a most recent electric power generating condition): current-voltage, the concentration of hydrogen (combustible gas)(sensed by a hydrogen concentration sensor or meter), and an oxygen concentration (sensed by an oxygen concentration sensor or meter). (2) A recirculating quantity of the anode off gas recirculated from valve 7 is set. (The recirculating quantity of the anode off gas is determined from the opening degree of valve 7 which is set in accordance with the operating condition of the system). (3) The required fuel quantity corresponding to the request output is calculated. (4) A fresh fuel quantity is determined from a difference (deficit) between the required fuel quantity and the recirculating quantity of the anode off gas (by setting the difference equal to the fresh fuel quantity in this example). The fresh fuel quantity is the quantity of fresh fuel to be fed newly. (5) A fresh air quantity is determined in accordance with the fresh fuel quantity. The fresh air quantity is the quantity (or flow rate) of air to be fed to the reforming section composed of vaporizer 3 and reformer 1, in accordance with the fresh fuel quantity. (The fresh air quantity is calculated from the heat quantity required for the reforming reaction in reformer 1.)(6) The temperature of the reformed gas after the supply of the anode off gas plus the fresh fuel plus the fresh air is ascertained (by a temperature sensor). (7) From the temperature of the reformed gas and the known efficiency of reformer 1 (or the hydrogen concentration of the reformed gas (sensed by the hydrogen concentration sensor) and the oxygen concentration of the reformed gas (sensed by the oxygen concentration sensor)), the controller determines the composition of the reformed gas, that is, detects the heat quantity.

At a step S3 following S2, controller B calculates an attainment temperature (projected or estimated temperature) of stack structure S corresponding to the request output, by using information such as a heat generation quantity of stack structure S (the quantity of heat generated in stack structure S) corresponding to the request output, the heat quantity of the reformed gas, the current temperature of stack structure S, and a heat release quantity of the piping (the quantity of heat discharged from the piping).

For the calculation of S3 in this example, controller B uses the following information: (1) the heat quantity of the reformed gas (temperature, heat capacity) and the temperature of stack structure S (stack temperature) obtained at S2; (2) the flow rate and temperature of air (generating air for electric power generation) supplied to the cathode side; (3) an outside temperature (ambient air temperature); (4) the heat release quantity from stack structure S corresponding to the outside temperature and the temperature of stack structure S (the quantity of heat released from the piping and insulating wall surfaces, excluding the quantity of heat released to the gas); (5) the heat generation quantity due to the electric power generation corresponding to the request output; and (6) the (known) heat capacity of stack structure S.

At a step S4 following S3, controller B examines whether the attainment temperature of stack structure S is within an allowable (temperature) range or not (to determine whether the heat quantity control of the reformed gas is required or not).

When the attainment temperature of stack structure S is within the allowable range, and the answer of S4 is Yes, then controller B proceeds from S4 to a step S5. At S5, controller B supplies the reformed gas to stack structure S without performing the heat (quantity) control of the reformed gas, that is without cooling the reformed gas.

When the attainment temperature of stack structure S exceeds the allowable range, and the answer of S4 is NO, then controller B proceeds from S4 to a step S6. At S6, controller B calculates a heat decrease quantity (a cooling temperature) of the reformed gas.

The product between the temperature difference between the attainment temperature of stack structure calculated at S3 and an allowable temperature (or allowable limit temperature) used in the decision step S4 and the heat capacity of the stack structure is the quantity of heat to be decreased (the cooling quantity of the stack structure). The cooling temperature of the reformed gas required to decrease the heat by this quantity is determined from the heat decrease quantity=the heat capacity (composition) of the reformed gas multiplied by (the stack allowable temperature minus the temperature after cooling), by using the information obtained at S2. When the reformed gas is supplied to the stack structure, the reformed gas is warmed to a temperature equal to the temperature of the stack structure, by receiving heat from the stack structure. Therefore, the heat used to warm the reformed gas is equal to the stack cooling quantity.

At a step S7 following S6, controller B calculates a desired coolant flow rate, that is a desired air flow rate, of the coolant supplied to heat exchanger 4, from the calculated heat decrease quantity and a heat exchange capability of heat exchanger 4.

For S7, by using the temperature, flow rate and heat capacity of the reformed gas obtained at S2, and the size of heat exchanger 4 (the area effective for the heat exchange), the controller B calculates the temperature and flow rate of the coolant fluid, such as air, having the known heat capacity, required to be supplied to the heat exchanger to cool the reformed gas to a predetermined lower temperature.

At a step S8 following S7, controller B cools the reformed gas in heat exchanger 4 by supplying the air in the calculated flow rate, to the heat exchanger 4, and then supplies the reformed gas thus cooled by heat exchanger 4, to stack structure S. After S8, controller B terminates the control process of FIG. 2. Thus, controller B controls the temperature of stack structure S within the allowable range, and thereby prevents overheating of stack structure S.

When the request output of the fuel cell system is increased steeply by an operation of accelerating the vehicle, for example, the fuel cell system of the first embodiment can respond to such a steep increase of the request output adequately. The temperature controller B calculates the attainment temperature of stack structure S which would be reached as the result of the steeply increased request output, and examines whether the attainment temperature is within the allowable temperature range or not. When the attainment temperature is higher than the allowable limit temperature, the fuel cell system cools the reformed gas (or decreases the heat quantity of the reformed gas) with the reformed gas cooler A (including heat exchanger 4). Thus, temperature controller B of the first embodiment detects the possibility of overheating of stack structure S by monitoring a vehicle operation condition and cools the reformed gas when the possibility of the overheating of stack structure S is detected.

In the case of a fuel cell system of an earlier technology, when the request output is increased, the stack structure is liable to be overheated by heat generation within the stack structure and a temperature increase of the reformed gas. By contrast, the fuel cell system of the first embodiment can prevent the supply of unwanted heat to the stack structure by decreasing the heat quantity of the reformed gas, and moreover improve the cooling effect by utilizing the reformed gas as the cooling gas. Therefore, the fuel cell system reduces the influence on stack structure S by the temperature variation of reformer 1, and functions properly even if the load is changed by sharp changes of the request output.

In the case of the stack structure of a small size, high output type, especially, the capability of the cooling by air is limited because air passages are narrow. Therefore, by the addition of cooling by the reformed gas, the fuel cell system of the first embodiment can stabilize the operating temperature of stack structure S, and make it possible to produce a high output, small sized fuel cell system which is specifically advantageous for vehicles and other applications in which the load is changed frequently and steeply.

The embodiment of the present invention is specifically advantageous when applied to a medium, high temperature type fuel cell system having an electrolyte such as solid oxide. By controlling the quantity of heat supplied from reformer 1 to stack structure S, the fuel cell system of this embodiment can improve the efficiency of the fuel cell system specifically in the above-mentioned type.

The temperature controller B can perform the heat control on the basis of temperature estimation at one point. However, it is optional to perform the heat control by using the results of temperature estimation at two or more points, or by using a difference between temperatures estimated at separate points.

Temperature controller B may be arranged to perform estimation by using one or more of input information items such as signals from a sensing device for sensing the request output to stack structure S, temperature sensing devices for sensing the temperatures of stack structure S, reformer 1, and the gases, respectively, flow rate sensing devices for sensing the flow rates of the gases, sensing devices for sensing the compositions of the gases, preliminarily determined temperature profiles of reformer 1 and the gases with respect to variation of the request output, and preliminarily determined profiles of the request output estimated from driving information (or driving conditions) and traffic information.

The fuel cell system of FIG. 1 includes the reformed gas distributor C for supplying the reformed gas to stack structure, without cooling the reformed gas in the reformed gas cooler A (heat exchanger 4). Therefore, the fuel cell system can control the heat quantity of the reformed gas not only by controlling the operation of reformed gas cooler A (between the operative state and inoperative state), but also by controlling the operation of the reformed gas distributor C. Moreover, with the reformed gas distributor C, the fuel cell system can control the quantity of heat inputted to stack structure S by supplying a mixture of the cooled reformed gas and the non-cooled reformed gas to stack structure S. In this case, it is possible to simplify the control and construction since the reformed gas cooler A can be arranged to operate always to provide a predetermined temperature without the need for varying the temperature.

The fuel cell system of FIG. 1 employs, as a main component of the reformed gas cooler A, the heat exchanger 4 using the cooling fluid (air). Therefore, it is possible to utilize the cooling fluid heated by the reformed gas, as a heat source for preheating the fuel and air, a heat source for vaporizer 3, and a heat source for air heating or air conditioning in the vehicle.

Figure 3:
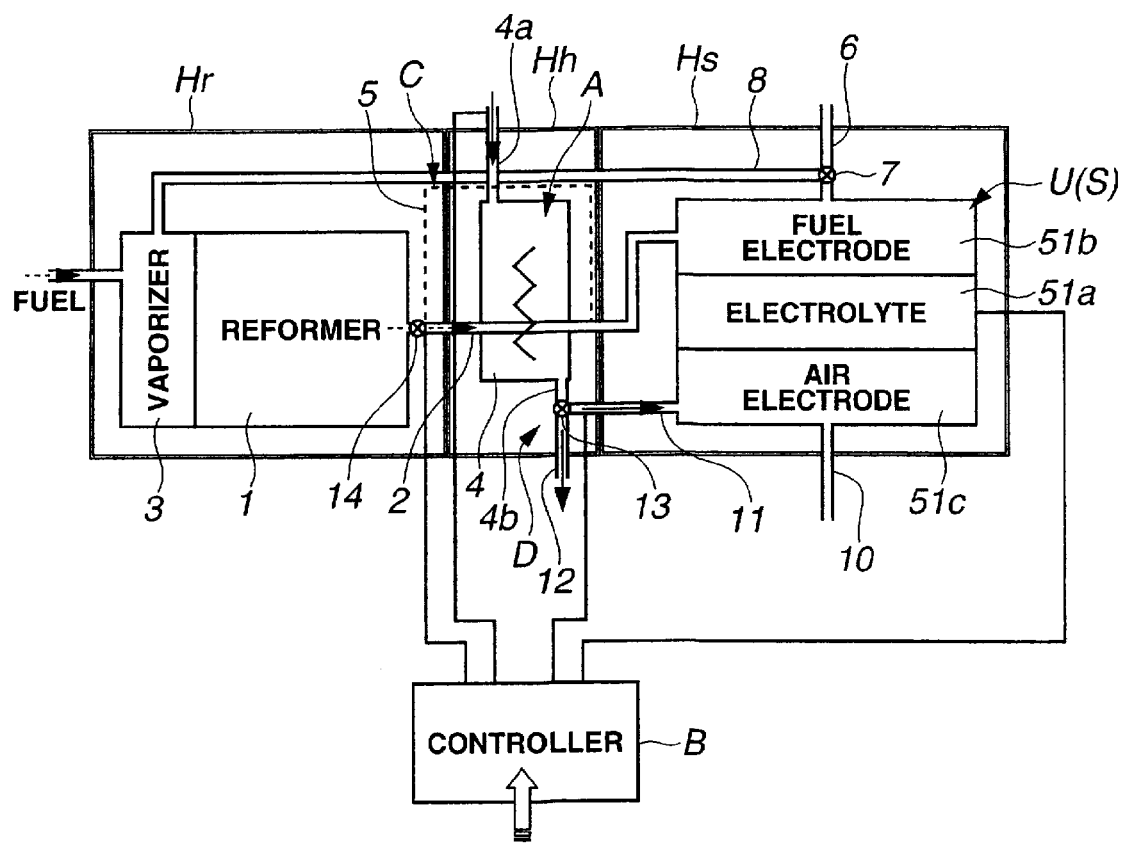
FIG. 3 is a schematic block diagram showing a solid electrolyte fuel cell system according to a second embodiment of the present invention.

FIG. 3 shows a solid electrolyte fuel cell system according to a second embodiment of the present invention. The same reference numerals as in the first embodiment are used for substantially identical component parts, and detailed explanation is omitted for the substantially identical parts.

The solid electrolyte fuel cell system of FIG. 3 includes the temperature control section which includes a second gas distributor D in addition to the reformed gas cooler A. Heat exchanger 4 is arranged to cool the reformed gas with a second gas serving as a coolant, and the second gas distributor is arranged to connect the heat exchanger selectively with one of a second gas supply passage 11 leading to the stack structure S, and a second gas discharge passage 12 leading to the outside. In this example, the second gas is air, and second gas distributor D is an air distributor to switch between a first select state connecting the coolant outlet or air outlet of heat exchanger 4 with air supply passage 11 for supplying the air to stack structure S, and a second select state connecting the coolant or air outlet of heat exchanger 4 with air discharge passage 12 for discharging the air to the outside without supplying to stack structure S. The second gas (air) distributor D of this example includes a selector (changeover) valve 13 disposed at a branch point at which the coolant outlet passage 4*b* branches into the second gas (air) supply passage 11 and the second gas (air) discharge passage 12.

The temperature controller is configured to control the operations of the reformed gas cooler A, the reformed gas distributor C, and the second gas (air) distributor D in accordance with the request output.

In the second embodiment, the reformer 1 (together with vaporizer 3), the heat exchanger 4 and the stack structure S are separately encased in heat insulating containers Hr, Hh and Hs. This insulating container structure composed of the container Hr enclosing reformer 1, the container Hh enclosing heat exchanger 4, and the container Hs enclosing stack structure S can insulate the reformer 1, heat exchanger 4 and stack structure S from one another thermally, and restrains the heat transfer or the exchange of heat therebetween, except the heat transfer through the reformed gas. By doing so, this insulating container structure composed of the separate insulating containers Hr, Hh and Hs can improve the effect of the control of the temperature of stack structure S by the control of heat quantity of the reformed gas, thereby stabilize the temperature of stack structure S, and further improve the controllability or following characteristic to the load varying operation (as in a vehicle) and the durability. In the other respects, the fuel cell system of FIG. 3 is substantially identical to the fuel cell system of FIG. 1, including the coolant flow regulator 44 though coolant flow regulator 44 is omitted in FIG. 3.

Figure 4:
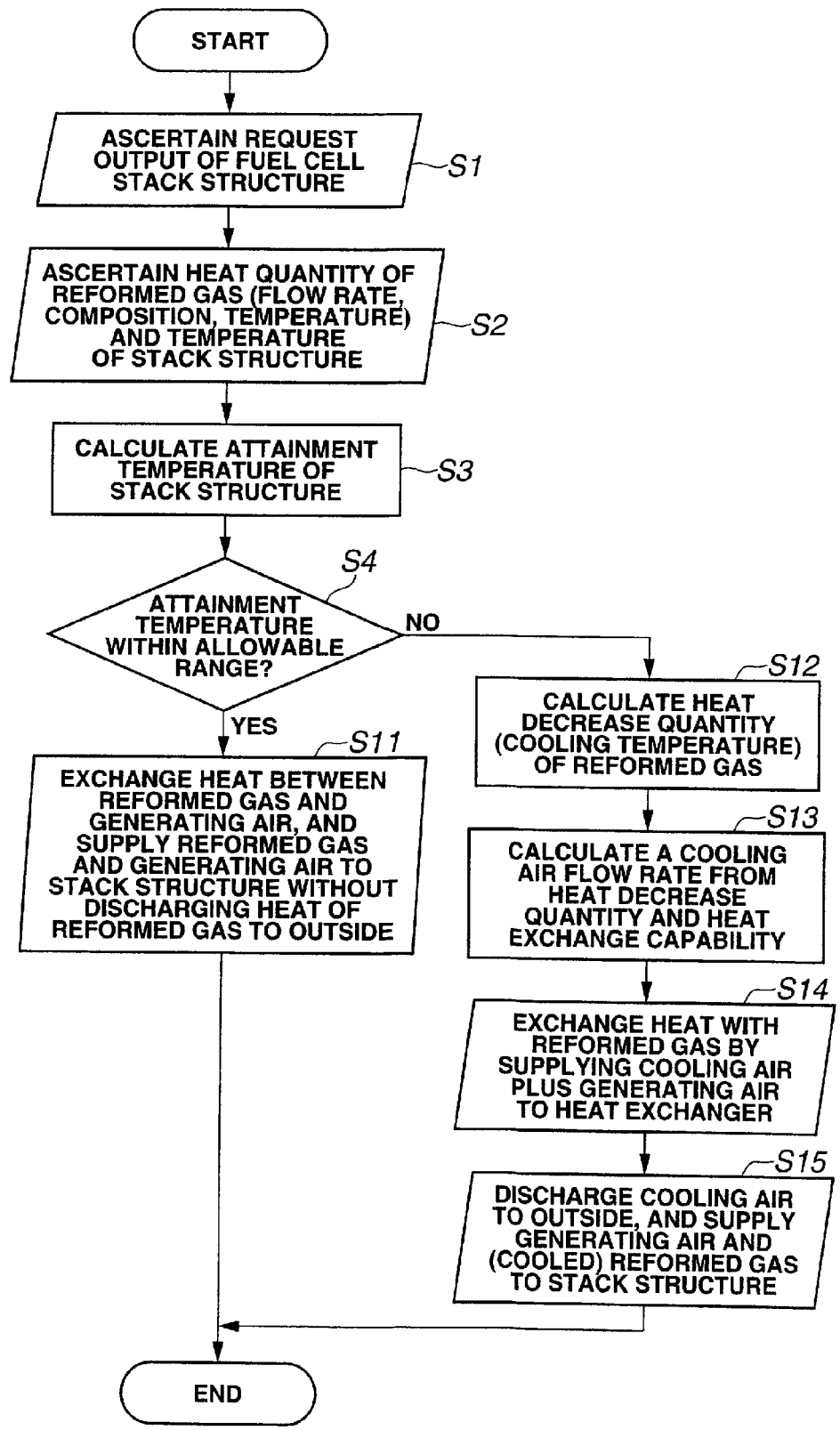
FIG. 4 is a flowchart showing a temperature control process performed by a controller shown in FIG. 3.

FIG. 4 shows a control process performed by the temperature controller B in the solid electrolyte fuel cell system according to the second embodiment. Steps S1~S4 are substantially identical to the steps S1~S4 of FIG. 2, so that the explanation is omitted.

When the attainment temperature of stack structure S is within the allowable range, and the answer of S4 is Yes, then controller B proceeds from S4 to a step S11. At S11, controller B decides to supply all the heat of the reformed gas to the stack structure without discharging the heat of the reformed gas to the outside of the system or to the parts other than stack structure S, performs the heat exchange between the reformed gas and the air (coolant fluid) in a predetermined quantity (generating air for electric power generation) in heat exchanger 4, and supplies the heated air through air supply passage 11 to stack structure S. The reformed gas is supplied through heat exchanger 4 and the reformed gas supply passage 2 to stack structure S.

When the attainment temperature of stack structure S exceeds the allowable range, and the answer of S4 is NO, then controller B proceeds from S4 to a step S12. At S12, controller B calculates the heat decrease (attenuation) quantity of the reformed gas (cooling temperature of the reformed gas). Step S12 is substantially identical to S6 of FIG. 1.

At a next step S13, controller B calculates the desired coolant flow rate, that is the air flow rate, of the coolant supplied to heat exchanger 4, from the calculated heat decrease quantity and the heat exchange capability.

At a next step S14, controller B performs a control operation to supply, to heat exchanger 4, air in the quantity equaling the sum of the quantity of the cooling air and the quantity of the power generating air (cooling air plus generating air), and performs the heat exchange between the reformed gas and the air. Then, at a step S15, controller B performs a control operation to discharge the air in the quantity equaling to the quantity of the cooling air to the outside of the system through the passage 12 and to supply the air in the quantity equaling to the quantity of the power generating air to the stack structure S by controlling the selector valve 13, and a control operation to supply the reformed gas cooled in heat exchanger 4, to stack structure S. After S15, controller B terminates the control process of FIG. 4. Thus, controller B controls the temperature of stack structure S within the allowable range, and thereby prevents overheating of stack structure S.

In the system of FIG. 1, the cooling air is supplied from air inlet passage 4*a* to heat exchanger 4, and discharged to the outside through air outlet passage 4*b*. On the other hand, the generating air for power generation to be supplied to the cathodes is supplied independently through the air supply passage 9 to stack structure S without passing through heat exchanger 4. In the system of FIG. 3, by contrast, the air to be supplied to the cathodes (the generating air for electric power generation) and the cooling air for cooling the reformed gas are supplied together to the heat exchanger 4 through the air inlet passage 4*a*. The air passed through heat exchanger 4 is distributed by the valve 13 between the part to be supplied to the cathodes and the part to be discharged to the outside. The calculation at S13 is similar to that of S7. In this case, the heat decrease quantity of the reformed gas is equal to a heat increase quantity of the air discharged through discharge passage 12 (=the heat capacity of the air multiplied by the difference between the temperature at the air inlet port (4*a*) of heat exchanger 4 and the temperature at the air outlet port (4*b*) of heat exchanger 4. In accordance with the result of the calculation at S13, the air for power generation and the air for cooling are supplied to the heat exchanger 4 (S14), and the valve 13 is controlled to divide the air let out from heat exchanger 4 through the air outlet port (4*a*) into the power generating air supplied to the cathodes and the cooling air only for the cooling.

In this way, the fuel cell system according to the second embodiment calculates the power generating air quantity (flow rate) and the cooling air quantity (flow rate) in accordance with the attainment temperature of stack structure S and the heat quantity to be decreased by the reformed gas. Then, the fuel cell system supplies the heat exchanger 4 with the air, as the coolant, in the quantity equaling to the sum of the power generating air quantity and the cooling air quantity from the air inlet port (4*a*), and divides the air after the heat exchange into the generating air to be supplied to stack structure S and the cooling air to be discharged to the outside. The inlet air quantity (the air flow rate through the air inlet port of heat exchanger 4) is determined by adding the power generating air quantity (flow rate) and the cooling air quantity (flow rate), and the valve 13 is controlled to set the air flow rate through supply passage 11 equal to the generating air quantity and the air flow rate through discharge passage 12 equal to the cooling air quantity.

The fuel cell system may be provided with a measuring section to measure the heat quantities of the reformed gas and the air after the heat exchange, and arranged to recalculate the generating air quantity (flow rate) after the heat exchange by using the results of the measurement, and to divide the outlet air from the heat exchanger 4 into the generating air and the cooling air to be discharged to the outside, in accordance with the result of the recalculation.

Furthermore, the fuel cell system according to the second embodiment can decrease the temperature difference between the reformed gas and the generating air for power generation and uniformize the heat conditions of the reformed gas and the generating air by using the air as the cooling fluid. When the heat quantity of the reformed gas is not decreased, the heat exchanger 4 can be used for exchanging heat between the reformed gas and the generating air. With this heat exchange between the reformed gas and the generating air, the fuel cell system can reduce the temperature difference between the reformed gas and the generating air, make uniform the temperature distribution in stack structure S, mitigate thermal shock at the time of supply of the reformed gas and the generating air to stack structure S, stabilize the temperature of stack structure in a load varying operation, and improve the durability of the system.

The air not supplied to stack structure S can be used in a combustor, for heating the air in the vehicle, or other applications.

Figure 5:
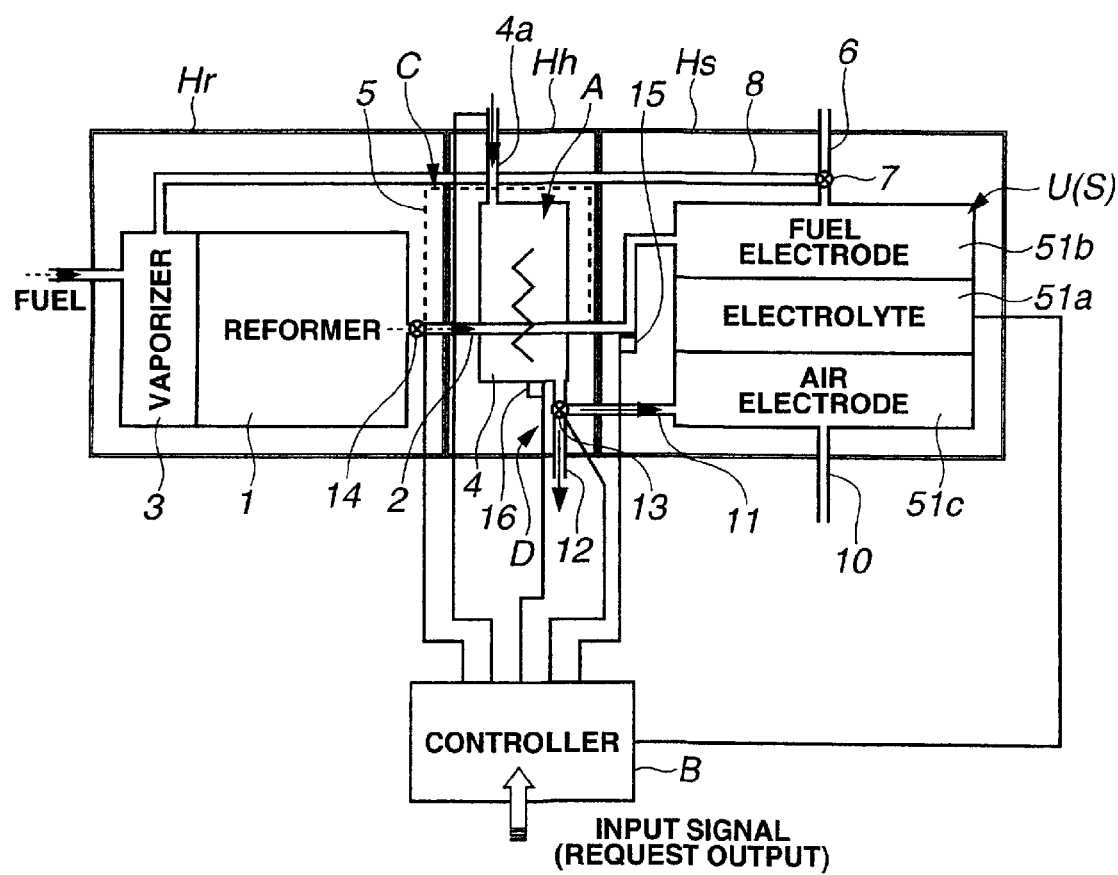
FIG. 5 is a schematic block diagram showing a solid electrolyte fuel cell system according to a third embodiment of the present invention.

FIG. 5 shows a solid electrolyte fuel cell system according to a third embodiment of the present invention. The same reference numerals as in the first embodiment are used for substantially identical component parts, and detailed explanation is omitted for the substantially identical parts.

The solid electrolyte fuel cell system of FIG. 5 is basically the same as the system of FIG. 3. The fuel cell system of FIG. 5 further includes a temperature sensor (or temperature measuring device) 15 to sense the temperature of the reformed gas on the reformed gas outlet side of heat exchanger 4, and a temperature sensor (or temperature measuring device) 16 to sense the temperature of the air on the air outlet side (4b) of heat exchanger 4. The sensed temperatures of these temperature sensors 15 and 16 are inputted to temperature controller B.

Figure 6:
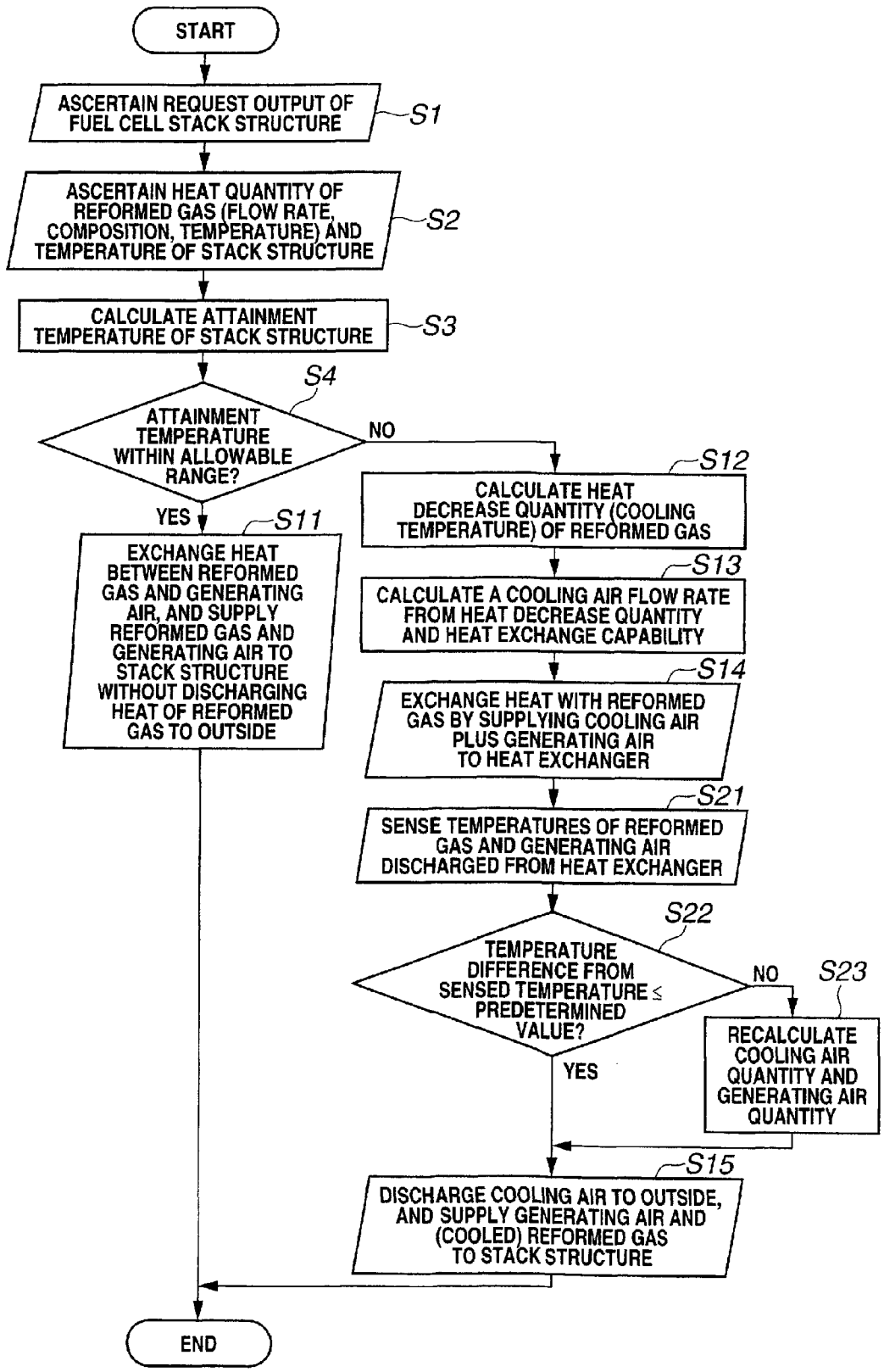
FIG. 6 is a flowchart showing a temperature control process performed by a controller shown in FIG. 5.

FIG. 6 shows a control process performed by the temperature controller B in the solid electrolyte fuel cell system according to the third embodiment. Steps S1~s4 and S11~S15 are substantially identical to the steps S1~S4 and S11~S15 of FIG. 4, so that the explanation is omitted.

When the attainment temperature of stack structure S exceeds the allowable range, and the answer of S4 is NO, then controller B proceeds from S4 through S12, S13 and S14, to a step S21. At S21, controller B ascertains the sensed reformed gas temperature of the reformed gas after the heat exchange sensed by temperature sensor 15 an the sensed air temperature of the air (generating air) after the heat exchange sensed by temperature sensor 16. Then, at a next step S22, controller B examines whether a reformed gas temperature difference between the sensed reformed gas temperature and an estimated reformed gas temperature is lower than or equal to a first predetermined value, and whether an air temperature difference between the sensed air temperature and an estimated air temperature is lower than or equal to a second predetermined value.

In this example, when the reformed gas temperature difference is equal to or lower than the first predetermined value and the air temperature difference is lower than or equal to the second predetermined value, then the answer of S22 is YES, and controller B proceeds from S22 to step 15. At S15, controller B discharges the cooling air separated from the generating air with valve 13, and supplies the generating air and the reformed gas to stack structure S as in S15 of FIG. 4. After S15, controller B terminates the control process of FIG. 6.

When the reformed gas temperature difference between the sensed reformed gas temperature and the estimated reformed gas temperature is higher than the first predetermined value, or the air temperature difference between the sensed air temperate and the estimated air temperature is higher than the second predetermined value, then the answer of S22 is NO, and controller B proceeds from S22 to a step 23. At S23, controller B recalculates the quantity of the cooling air and the quantity of the power generating air in accordance with the sensed temperatures when at least one of the sensed reformed gas temperature and the sensed air temperature after the heat exchange deviates from the result of the initial calculation.

After S23, controller B proceeds to S15, and performs the control operation to discharge the air in the quantity equaling to the recalculated quantity of the cooling air recalculated at S23 to the outside of the system through passage 12 and to supply the air in the quantity equaling to the recalculated quantity of the generating air recalculated at S23 to the stack structure S through passage 11, by controlling the selector valve 13, and the control operation to supply the reformed gas cooled in heat exchanger 4, to stack structure S. After S15, controller B terminates the control process of FIG. 6. When the sensed reformed gas temperature is higher than the result of the initial calculation, and/or when the sensed air temperature is lower than the result of the initial calculation, then the heat quantity discharged to the outside according to the initially calculated quantities of the cooling air and the generating air is too small to prevent an undesired increase of the temperature of stack structure S. Therefore, in this case, the fuel cell system increases the quantity of the generating air supplied to stack structure beyond the initially calculated quantity of the power generating air, by the amount corresponding to the temperature difference, in accordance with the temperatures of the reformed gas passed through heat exchanger 4 and the air passed through heat exchanger 4. When, on the other hand, the sensed reformed gas temperature is lower than the result of the initial calculation, and/or when the sensed air temperature is higher than the result of the initial calculation, then the fuel cell system decreases the quantity of the air supplied to stack structure S.

Figure 7:
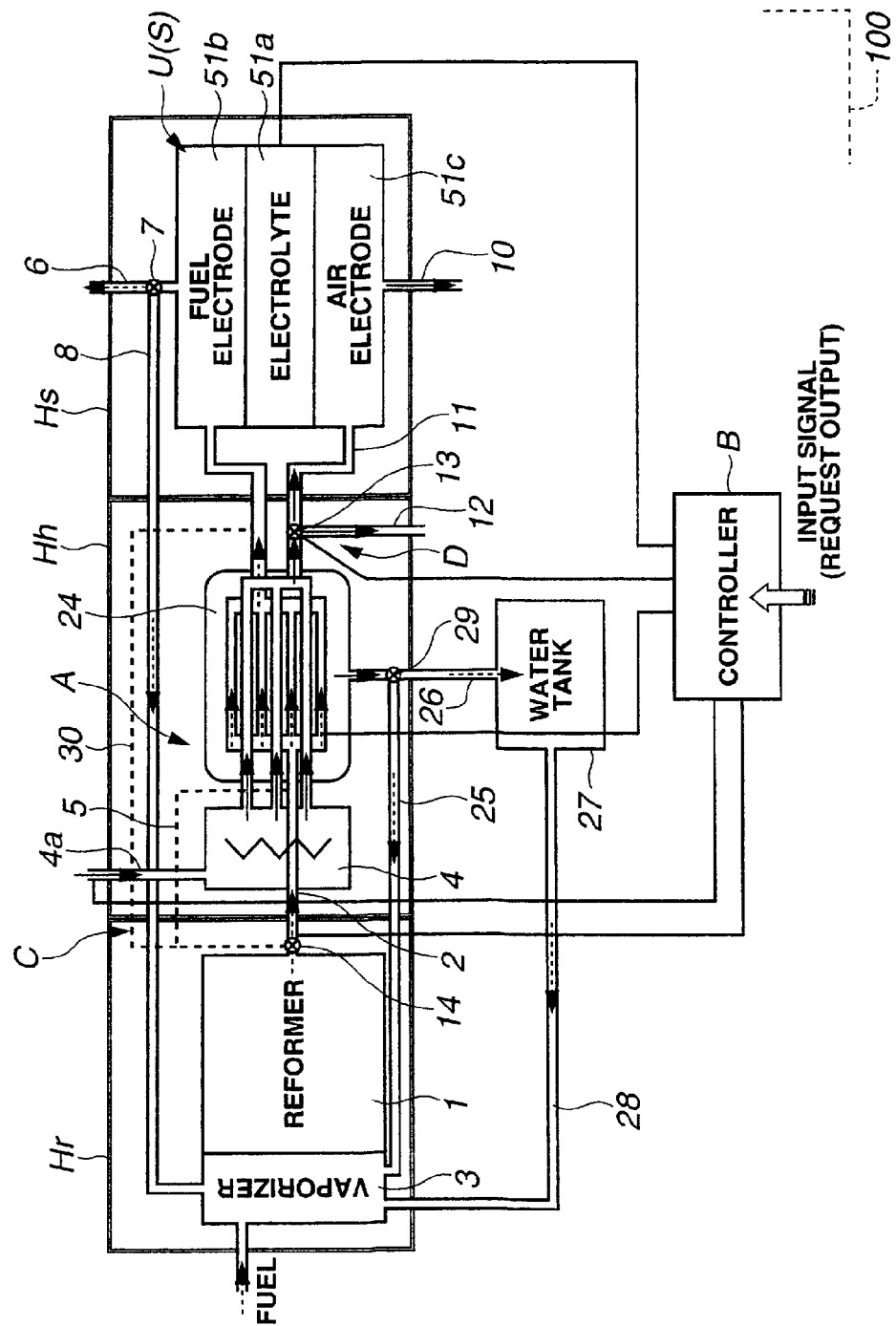
FIG. 7 is a schematic block diagram showing a solid electrolyte fuel cell system according to a fourth embodiment of the present invention.

FIG. 7 shows a solid electrolyte fuel cell system according to a fourth embodiment of the present invention. The same reference numerals as in the first embodiment are used for substantially identical component parts, and detailed explanation is omitted for the substantially identical parts.

The reformed gas cooler A shown in FIG. 7 includes a steam separator 24 in addition to the heat exchanger 4. Steam separator 24 is a device to separate steam from the reformed gas passed through heat exchanger 4. In the fuel cell system of FIG. 3 (and the fuel cell system of FIG. 5), the second gas (air) distributor D including the air supply passage 11, air discharge passage 12 and selector valve 13 is connected directly with heat exchanger 4. In the fuel cell system of FIG. 7, by contrast, a similar second gas (air) distributor D (11, 12 and 13) is connected with steam separator 24. Therefore, the second gas (air) distributor D (11, 12 and 13) is arranged to connect the air outlet of steam separator 24 selectively with one of the second gas (air) supply passage 11 leading to the air electrodes of stack structure S, and the second gas (air) discharge passage 12 leading to the outside. In this example, the second gas (air) distributor D includes the selector or switchover valve 24 arranged to switch between the first select state connecting the air outlet of steam separator 24 with the air supply passage 11 for supplying the air to stack structure S, and the second select state connecting the air outlet of steam separator 24 with the air discharge passage 12 for discharging the air to the outside without supplying to stack structure S.

The steam separated by steam separator 24 is supplied to vaporizer 3 through a return passage 25, and used for the reforming reaction of fresh fuel gas. Alternatively, the steam is conveyed through a drain passage 26, liquidized and stored in a water tank 27. From water tank 27, the water is supplied through a water passage 28 to vaporizer 3 and used as a water for reformation. At a branch point at which the return passage 25 branches off from drain passage 26, there is provided a selector or changeover valve 29.

Moreover, in the example of FIG. 7, the reformed gas distributor C further includes a second bypass passage 30 bypassing the heat exchanger 4 and steam separator 24, in addition to the (first) bypass passage 5 bypassing only the heat exchanger 4. In the reformed gas supply passage 2 extending from reformer 1 to stack structure S, the first bypass passage 5 extends from the upstream point on the upstream side of heat exchanger 4, to the intermediate point between the heat exchanger 4 and steam separator 24, bypassing only the heat exchanger 4, and the second bypass passage 30 extends from the upstream point to the downstream point on the downstream side of steam separator 24 (between steam separator 24 and stack structure S), bypassing both of heat exchanger 4 and steam separator 245.

As in the fuel cell systems of FIGS. 1, 3 and 5 according to the first, second and third embodiments, the fuel cell system of FIG. 7 includes the coolant flow regulator 44 (shown only in FIG. 1), and is adapted to be mounted on a vehicle 100 as a power source.

Figure 8:
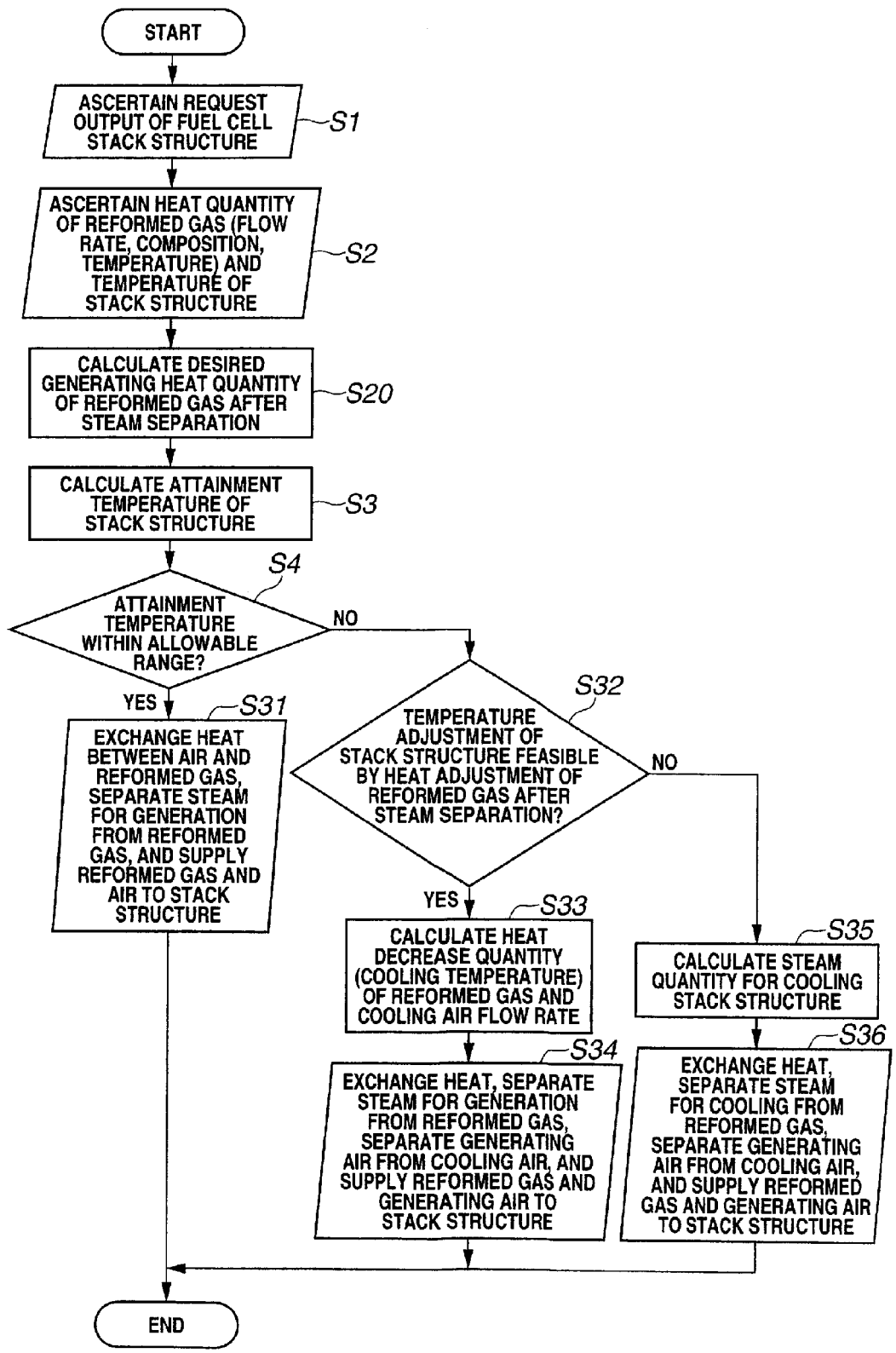
FIG. 8 is a flowchart showing a temperature control process performed by a controller shown in FIG. 7.

FIG. 8 shows a control process performed by the temperature controller B in the solid electrolyte fuel cell system according to the fourth embodiment. Steps S1~S4 are substantially identical to the steps S1~S4 of FIG. 2, so that the explanation is omitted.

At a step S20 between S2 and S3, controller B calculates a desired heat quantity of the reformed gas after the steam separation, adequate for the electric power generation. At S3, for the calculation of the attainment temperature of stack structure S, controller B uses this desired heat quantity of the reformed gas after a predetermined amount of steam is separated.

When the attainment temperature of stack structure S is within the allowable range, and the answer of S4 is Yes, then controller B proceeds from S4 to a step S31. At S31, controller B performs the heat exchange between the reformed gas and the air in a predetermined quantity in heat exchanger 4, separates steam in a predetermined quantity adequate for the power generation, from the reformed gas after the heat exchange, and supplies the air through air supply passage 11 to stack structure S, and the reformed gas through the reformed gas supply passage 2 to stack structure S.

When the attainment temperature of stack structure S exceeds the allowable range, and the answer of S4 is NO, then controller B proceeds from S4 to a step S32. At S32, controller B examines whether the temperature adjustment of stack structure is feasible by the heat adjustment of the reformed gas after the steam separation, or not.

For the determination of S32, controller B recalculates the heat capacity (composition) of the reformed gas after the steam separation, from the heat capacity (composition) of the reformed gas determined at S2. The cooling quantity of stack structure S by the reformed gas is equal to the product obtained by multiplying the heat capacity of the reformed gas by the difference resulting from subtraction of the temperature of the reformed gas after the cooling from the allowable temperature of stack structure S, as explained before for S6. Since the heat capacity of the reformed gas is decreased by the separation of steam from the reformed gas, the cooling capability of cooling the stack structure by the reformed gas becomes lower (because a lower limit value is set for the temperature of the reformed gas after the cooling). Therefore, it is possible to perform the judgment of S32 by examining whether the heat decrease quantity (the cooling quantity of stack structure S) is smaller than or equal to the product resulting from multiplication between the heat capacity of the reformed gas after the steam separation and the temperature difference obtained by subtracting a lowest cooling temperature of the reformed gas from the allowable temperature of stack structure S. Thus, the judgment of S32 is performed basically by the calculation without the need for providing an additional sensor.

When the answer of S32 is YES since the judgment is that it is possible to adjust the temperature of stack structure S by adjusting the heat quantity of the reformed gas after the steam separation, then controller B proceeds to a step S33. At S33, controller B calculates the heat decrease quantity of the reformed gas (cooling temperature) and the flow rate of the air for cooling. Then, at a step S34, controller B performs the heat exchange between the reformed gas and the air in the predetermined quantity, separates steam in the predetermined quantity adequate for the power generation from the reformed gas passed through heat exchanger 4, divides the air into the power generating air and the cooling air, and supplies the air and reformed gas to stack structure S.

When the answer of S32 is NO since the judgment is that it is not possible to adjust the temperature of stack structure S by adjusting the heat quantity of the reformed gas after the steam separation, then controller B proceeds to a step S35. At S35, controller B calculates the quantity of steam required for cooling stack structure S within the total quantity of steam contained in the reformed gas. Then, at a step S36, controller B performs the heat exchange between the reformed gas and the air in the predetermined quantity, separates steam in the predetermined quantity for the cooling from the reformed gas passed through heat exchanger 4, divides the air into the power generating air and the cooling air, and supplies the air and reformed gas to stack structure S.

When the judgment is that there is no need for decreasing the heat quantity of the reformed gas (or cooling the reformed gas), this fuel cell system calculates the desired steam quantity optimal to the power generation in accordance with the composition of the reformed gas. In accordance with the thus calculated desired power generating steam quantity, the fuel cell system separates steam from the reformed gas to obtain the reformed gas containing steam in the desired generating steam quantity, by regulating a pressure in steam separator 24, and regulating the ratio between the quantity of the reformed gas supplied to steam separator 24 and the quantity of the reformed gas bypassing steam separator 24.

When the judgment is that there is a need for decreasing the heat quantity of the reformed gas (or cooling the reformed gas), this fuel cell system determines the steam separation quantity from the quantity of heat taken off from stack structure S by the reformed gas and the air.

Thus, the fuel cell system adjusts the steam quantity to the optimum quantity for power generation when the system can cool the stack structure sufficiently with the reformed gas and air even if the steam quantity is adjusted to the optimum quantity. However, in some cases, steam is separated too much from the reformed gas, and it becomes impossible to receive heat of a desired quantity from stack structure S. Therefore, when the system is unable to cool the stack structure sufficiently with the reformed gas and air if the steam quantity is adjusted to the optimum quantity for power generation, then the fuel cell system separates steam partially from the reformed gas, leaving the steam required for cooling the stack structure S. The system gives priority to the adjustment of the steam quantity for cooling the stack structure, over the adjustment of the steam quantity for power generation.

Thus, the fuel cell system of FIG. 7 employs the steam separator 24 to adjust the quantity of steam contained in the reformed gas or the moisture content to the optimum value for power generation in the case of a steady state operation. The quantity of steam contained in the reformed gas optimum to the power generation is determined in consideration of unreformed carbon hydride fuel contained in the reformed gas.

An increase in the quantity of steam contained in the reformed gas increases the heat capacity of the reformed gas, and hence enhances the effect of cooling the stack structure when supplied to stack structure S. Therefore, when the judgment is that stack structure S is going to fall into the overheated state, the fuel cell system determines the quantity of steam to be separated from the reformed gas in order to stabilize (cool) the temperature of stack structure S in priority over the adjustment of steam quantity to the optimum for power generation.

Figure 9:
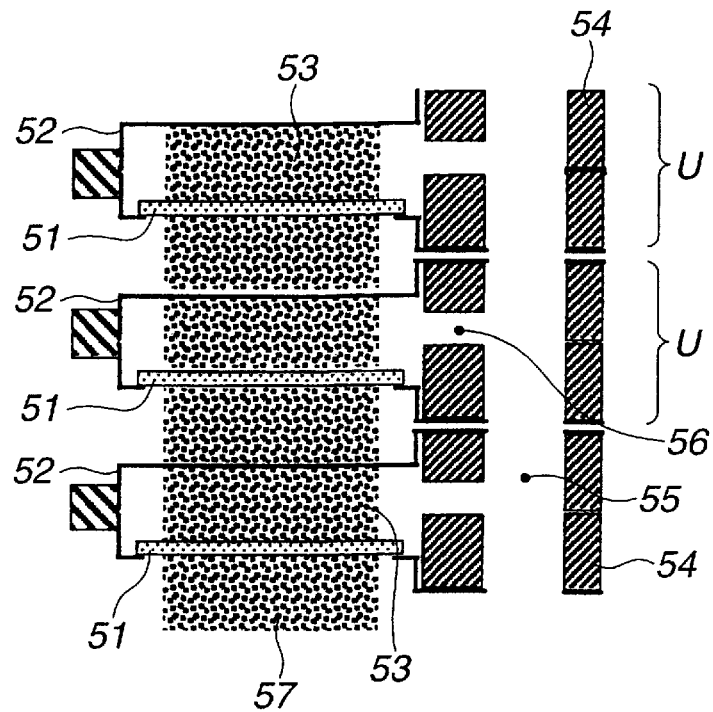
FIG. 9 is a sectional view for illustrating the internal structure of a stack structure used in the illustrated embodiments.

In each of the preceding embodiments, the stack structure is in the cylindrical form of the stack of annular fuel cell units U shaped like a circular disc as shown in FIGS. 9 and 10. In the cylindrical stack structure, the central portion of stack structure S is high in heat capacity, and heat tends to be kept in the central portion, so that the cooling by air supplied for power generation to air electrodes from the outer periphery of stack structure S tends to be insufficient for cooling the central portion.

According to the illustrated embodiments of the present invention, the fuel cell system utilizes, for cooling the stack structure, the reformed gas treated for uniform temperature with air. By supplying the reformed gas from the central portion of stack structure radially outwards to each cell unit U, the fuel cell system can cool the central portion of stack structure S effectively. Moreover, because the reformed gas and air are treated in the heat exchanger toward equal temperatures, the fuel cell system can cool the entirety of stack structure S uniformly, by cooling radially inwards from the outer periphery and radially outwards from the central portion of stack structure.

Therefore, when installed in a vehicle, the fuel cell system according to each of the illustrated embodiments can generate the electric power adequately in accordance with changes in the load, and realize a small sized, high output power source.

In each of the illustrated embodiments, the fuel cell system includes a reformer arranged to produce a hydrogen-rich reformed gas from fuel, oxygen and water, and a stack structure including the stack of fuel cell units so that electric power is generated by supplying the reformed gas and air to each fuel cell unit. The reformer is arranged to produce the hydrogen-rich reformed gas by at least one of steam reforming, partial oxidation reforming and auto thermal reaction combining the steam reforming reaction and partial oxidation reaction. The reforming reaction is performed in the temperature range of 500-900 degrees C., so that the temperature of the reformed gas supplied to the stack structure becomes high.

Therefore, the fuel cell system according to each of the illustrated embodiments further includes a reformed gas cooler to cool the reformed gas supplied from the reformer to the stack structure, and a temperature control section to control the temperature of the stack structure. The temperature control section may include temperature controlling means for controlling the operation of the reformed gas cooler in accordance with a request output of the stack structure.

The thus-constructed fuel cell system can minimize or eliminate influence of the temperature changes in the reformer on the stack structure, by cooling the reformed gas according to the need. By so doing, the fuel cell system can prevent the stack structure from falling into the overheated state even if the fuel cell system is operated to increase the output of the stack structure steeply in response to a steep increase of the request output. Therefore, the fuel cell system according to each embodiment is very advantageous when used as a power source of a vehicle.

According to the embodiments shown in FIGS. 1-8, the control system or process of controlling the temperature of the stack structure (S) includes a first element (a first means or first step (such as S1, S2, S3, S4)) for detecting a predetermined stack operating condition representing the possibility of overheating of the stack structure, a second element (second means or second step (such as S5; S11; S31)) for controlling the heat quantity of the reformed gas in a first (non-cooling) mode when the predetermined stack operating condition is not detected, and a third element (third means or third step (such as S8; S14, S15; S34, S36)) for controlling the heat quantity of the reformed gas in a second (cooling) mode. In the second element (S5; S11; S31), the reformed gas and the second gas (such as air) are supplied to the stack structure in the first (non-cooling) mode designed not to decrease the heat supplied from the reformed gas to the stack structure (or to prevent the heat of the reformed gas from being discharged to the outside of the system without supplying to the stack structure). In the third element (S8; S14, S15; S34, S36), the reformed gas and the second gas (air) are supplied to the stack structure in the second (cooling) mode to decrease the heat supplied from the reformed gas to the stack structure and to discharge part of the heat of the reformed gas to the outside of the stack structure.

The first element (S1-S4) may include: a first sub-element (S1) for ascertaining a request output representing the quantity of the output of the stack structure requested or required by a load, by calculation or by receiving information from an external controller; a second sub-element (S2, S3) for calculating an attainment temperature of the stack structure which would be reached by the stack structure if the reformed gas is supplied to the stack structure (in the first mode) in response to the request output (, from the current temperature of the stack structure and the estimated heat quantity of the reformed gas), and a third sub-element (S4) for comparing the attainment temperature with an allowable upper limit temperature of the stack structure. The third element (S8; S14, S15; S34, S36) may include: a first sub-element (S6; S12; S33) for calculating a heat decrease quantity representing the quantity of heat to be subtracted from the heat quantity of the reformed gas when the attainment temperature is higher than the allowable upper limit temperature; a second sub-element (S7, S8; S13, S14; S33, S34 etc.) for cooling the reformed gas to subtract the heat decrease quantity, and a third sub-step (S8; S15; S34 etc.) for supplying the cooled reformed gas to the stack structure to prevent overheating.

This application is based on a prior Japanese Patent Application No. 2007-315557 filed on Dec. 6, 2007. The entire contents of the prior Japanese Patent Application No. 2007-315557 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A solid electrolyte fuel cell system comprising:
a reformer to produce a hydrogen-rich reformed gas from fuel, oxygen and water;
a stack structure including a stack of fuel cell units each receiving air and the reformed gas, and producing electricity;
a reformed gas cooler to cool the reformed gas supplied from the reformer to the stack structure; and
a temperature control section to control operation of the reformed gas cooler;
wherein the temperature control section comprises a temperature controller to control the reformed gas cooler in accordance with a request output for the stack structure, the temperature controller being programmed to ascertain the request output for the stack structure, a temperature of the stack structure, and a heat quantity of the reformed gas;

examine whether an attainment temperature of the stack structure is within an allowable range;

if the attainment temperature is not within the allowable range, calculate a heat decrease quantity of the reformed gas;

calculate a desired coolant flow rate that is a desired air flow rate of coolant supplied to a heat exchanger from the calculated heat decrease quantity and a heat exchange capability of the heat exchanger; and supply the reformed gas to the stack structure and coolant to the heat exchanger.

2. The fuel cell system as claimed in claim 1, wherein the temperature control section further comprises a reformed gas distributor to supply the reformed gas from the reformer to the stack structure, bypassing the reformed gas cooler, and wherein the temperature controller is programmed to control the reformed gas cooler and the reformed gas distributor.

3. The fuel cell system as claimed in claim 1, wherein the reformed gas cooler comprises the heat exchanger to cool, using coolant, the reformed gas supplied from the reformer to the stack structure.

4. The fuel cell system as claimed in claim 3, wherein the reformed gas cooler further comprises a coolant flow regulator to regulate flow of coolant through the heat exchanger, and the temperature control section is programmed to control operation of the reformed gas cooler by controlling the coolant flow regulator.

5. The fuel cell system as claimed in claim 3, wherein the heat exchanger is arranged to cool the reformed gas with air serving as coolant, the temperature control section comprises an air distributor to connect the heat exchanger selectively with one of an air supply passage leading to the stack structure to supply air to the stack structure, and an air discharge passage leading outside to discharge air outside without supply to the stack structure, and the temperature control section is programmed to control the air distributor.

6. The fuel cell system as claimed in claim 3, wherein the reformed gas cooler comprises the heat exchanger, and a steam separator to separate steam from the reformed gas passed through the heat exchanger.

7. The fuel cell system as claimed in claim 1, wherein the fuel cell system further comprises a first insulating container encasing the reformer, and a second insulating container encasing the stack structure.

8. The fuel cell system as claimed in claim 7, wherein the fuel cell system further comprises a third insulating container encasing the reformed gas cooler.

9. The fuel cell system as claimed in claim 1, wherein each of the fuel cell units comprises a cell including a solid electrolyte layer sandwiched between a fuel electrode layer and an air electrode layer, and a separator plate supporting the cell and covering the fuel electrode layer, and each of the fuel cell units is in circular disc form.

10. A vehicle comprising the fuel cell system claimed in claim 1, as a power source.

11. The vehicle as claimed in claim 10, wherein the request output for the stack structure is determined in accordance with a vehicle operation condition.

12. The vehicle as claimed in claim 11, wherein the vehicle operation condition is provided by a condition of an accelerator pedal of the vehicle.

13. The fuel cell system as claimed in claim 1, wherein the temperature controller of the temperature control section is programmed to:

detect a predetermined stack operating condition representing a possibility of overheating of the stack structure, control the heat quantity of the reformed gas in a non-cooling mode without cooling the reformed gas supplied to the stack structure when the predetermined stack operating condition is not detected and control the heat quantity of the reformed gas in a cooling mode to cool the reformed gas with the reformed gas cooler when the predetermined stack operating condition is detected.

14. The fuel cell system as claimed in claim 13, wherein the temperature controller is programmed to:

calculate the attainment temperature of the stack structure reachable by the stack structure if the reformed gas is supplied to the stack structure in the non-cooling mode in response to the request output, based on current temperature of the stack structure and estimation of the heat quantity of the reformed gas, and compare the attainment temperature with an allowable upper limit temperature in the allowable range of the stack structure, wherein the ascertained request output represents a quantity of an output of the stack structure required by a load.

15. The fuel cell system as claimed in claim 14, wherein the temperature controller is programmed to:

cool the reformed gas to subtract the heat decrease quantity, and supply, to the stack structure, the reformed gas cooled by at least the heat decrease quantity in order to prevent overheating, wherein the calculated heat decrease quantity represents another heat quantity to be subtracted from the heat quantity of the reformed gas when the attainment temperature exceeds the allowable upper limit temperature.

16. A solid electrolyte fuel cell control system comprising:

a reformer to produce a hydrogen-rich reformed gas from fuel, oxygen and water;

a stack structure including a stack of fuel cell units each receiving a second gas and the reformed gas, and producing electricity;

a reformed gas cooler configured to cool the reformed gas supplied from the reformer to the stack structure; and a temperature control section to control operation of the reformed gas cooler, the temperature control section including a temperature controller programmed to detect a predetermined stack operating condition representing a possibility of overheating of the stack structure, control a heat quantity oldie reformed gas in a first mode without cooling the reformed gas supplied to the stack structure when the predetermined stack operating condition is not detected, and control the heat quantity of the reformed gas in a second mode to cool the reformed gas with the reformed gas cooler when the predetermined stack operating condition is detected, in the second mode, the temperature control section is programmed to ascertain a request output for the stack structure, a temperature of the stack structure, and a heat quantity of the reformed gas;

calculate a heat decrease quantity of the reformed gas; and calculate a desired coolant flow rate that is a desired air flow rate of a coolant supplied to a heat exchanger from the calculated heat decrease quantity and a heat exchange capability of the heat exchanger; and supply the reformed gas to the stack structure and the coolant to the heat exchanger.

17. The fuel cell control system as claimed in claim 16, wherein the temperature controller is programmed to:

calculate an attainment temperature of the stack structure reachable by the stack structure if the reformed gas is supplied to the stack structure in the first mode in response to the request output, based on current temperature of the stack structure and estimation of the heat quantity of the reformed gas, and compare the attainment temperature with an allowable upper limit temperature of the stack structure, wherein the ascertained request output represents a quantity of an output of the stack structure required by a load.

18. The fuel cell system as claimed in claim 17, wherein the temperature controller is programmed to:

calculate the heat decrease quantity representing another heat quantity to be subtracted from the heat quantity of the reformed gas When the attainment temperature exceeds the allowable upper limit temperature, cool the reformed gas to subtract the heat decrease quantity in the second mode, and supply, to the stack structure, the reformed gas cooled in the second mode by at least the heat decrease quantity in order to prevent overheating.

* * * * *